United States Patent
Fisher et al.

(10) Patent No.: US 10,876,881 B2
(45) Date of Patent: Dec. 29, 2020

(54) APPARATUS AND METHOD FOR CHARACTERIZING PERFORMANCE OF PUMPS AND VERIFYING ACCURATE OPERATION OF FLOWMETERS

(71) Applicant: Halliburton Energy Services, Inc., Houston, TX (US)

(72) Inventors: Chad Adam Fisher, Cache, OK (US); Wesley John Warren, Marlow, OK (US); Cameron Michael Kramer, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 386 days.

(21) Appl. No.: 15/908,609

(22) Filed: Feb. 28, 2018

(65) Prior Publication Data

US 2019/0265094 A1      Aug. 29, 2019

(51) Int. Cl.
*G01F 25/00*      (2006.01)
(52) U.S. Cl.
CPC ...... *G01F 25/0038* (2013.01); *G01F 25/0046* (2013.01); *Y10T 137/2877* (2015.04); *Y10T 137/8342* (2015.04); *Y10T 137/85978* (2015.04)
(58) Field of Classification Search
None
See application file for complete search history.

(56) References Cited

U.S. PATENT DOCUMENTS

| | | | |
|---|---|---|---|
| 3,177,699 A * | 4/1965 | Lindquist | G01F 25/0038 73/1.31 |
| 3,657,919 A | 4/1972 | Brown | |
| 3,888,106 A * | 6/1975 | Last | G01F 25/0038 73/1.27 |
| 3,939,688 A | 2/1976 | Misch et al. | |
| 4,073,304 A | 2/1978 | Lerner et al. | |

(Continued)

FOREIGN PATENT DOCUMENTS

| | | | |
|---|---|---|---|
| CN | 202057396 U | * 11/2011 | |
| EP | 1983310 A1 | * 10/2008 | G01F 1/125 |
| KR | 101828401 B1 | * 2/2018 | |

OTHER PUBLICATIONS

Tezuka et al., "Calibration tests of pulse-Doppler flow meter at national standard loops" Flow Measurement and Instrumentation 19 (2008) 181-187 (Year: 2008).*

(Continued)

*Primary Examiner* — John C Kuan
(74) *Attorney, Agent, or Firm* — Gilliam IP PLLC (57) ABSTRACT

A valve of a first container is opened to remove fluid into a second container, where the output of the first container is above a maximum fluid level of the second container. The valve of the first container is closed based on a sensor indicating that a fluid level in the first container is at a first fluid level. A pump pumps the fluid from the second container to the first container via a flow meter. An indication is received that causes the pump to stop pumping based on the indication. An amount of fluid pumped into the first container is determined based on the first fluid level and a second fluid level indicated by the sensor. An indication of total fluid volume measured by the flow meter is compared to the amount of fluid pumped. An indication of accuracy of the flow meter is output based on the comparison.

14 Claims, 9 Drawing Sheets

(56) References Cited

U.S. PATENT DOCUMENTS

| | | | |
|---|---|---|---|
| 4,474,049 A * | 10/1984 | Hansen | E21B 43/34 |
| | | | 73/1.34 |
| 4,718,443 A | 1/1988 | Adney et al. | |
| 6,360,579 B1 | 3/2002 | De Boom et al. | |
| 7,441,437 B2 | 10/2008 | Klees et al. | |
| 2016/0291609 A1 * | 10/2016 | Lucas | C09K 8/62 |
| 2017/0016755 A1 * | 1/2017 | Boussange | G01F 25/0038 |
| 2017/0052056 A1 * | 2/2017 | Yamasaki | G01F 25/0046 |
| 2017/0100025 A1 * | 4/2017 | Lengsfeld | A61L 2/18 |
| 2017/0284853 A1 * | 10/2017 | Ahmad | G01F 25/0038 |
| 2017/0356788 A1 * | 12/2017 | Bhatasana | G01F 25/0015 |
| 2018/0037451 A1 * | 2/2018 | Johnson | G01F 1/007 |
| 2018/0188101 A1 * | 7/2018 | Weindl | G01F 25/003 |

OTHER PUBLICATIONS

Choi et al., "Evaluation of flowmeters for heat metering" Flow Measurement and Instrumentation 22 (2011) 475-481 (Year: 2011).*

* cited by examiner

APPARATUS AND METHOD FOR CHARACTERIZING PERFORMANCE OF PUMPS AND VERIFYING ACCURATE OPERATION OF FLOWMETERS

FIELD OF USE

The disclosure generally relates to a fluid diagnostic system, and more particularly to a fluid diagnostic system for characterizing performance of a pump and accuracy of a flowmeter.

BACKGROUND

Pumps and flowmeters are common devices used to move fluid such as liquids. Pumps are devices which move fluid by a mechanical action that typically involves creating a suction or pressure to move the fluid. Flow meters measure a fluid volume. A fluid system may have a plurality of pumps and flow meters to move fluid from one location to another. Operation of the pumps and/or flow meters is typically verified to confirm that the fluid system moves desired amounts of the fluid.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to characterizing performance of pumps and accuracy of flowmeters used to dispense fluid to well service systems such as frac blending units used in extraction of hydrocarbon. Aspects of this disclosure can be instead applied to characterize operation of pumps and accuracy of flowmeters in other applications other than well servicing systems. In other instances, well-known instruction instances, protocols, structures and techniques have not been shown in detail in order not to obfuscate the description.

Overview

Embodiments described herein are directed to a fluid diagnostic system for characterizing performance of a pump and verifying accurate operation of a flow meter based on use of a calibrated container and a secondary container. One or both containers may have varying levels of fluid. The calibrated container and secondary container may be arranged such that an output of the calibrated container is always above a maximum fluid level of the secondary container.

The characterization of performance of the pump and verification of accurate operation of a flow meter begins with an initialization process. The initialization process involves arranging the calibrated container with fluid at an initial fluid level. Fluid may be added to the calibrated container to reach the initial fluid level or alternatively fluid may be drained from the calibrated container to the initial fluid level. The fluid may be added from the secondary container which also has fluid or from another source to the initial fluid level. The fluid may be drained from the calibration container to the initial fluid level by opening a valve on the calibrated container so that the fluid in the calibrated container flows into the secondary container under a force of gravity and closing the valve when the fluid is at the initial fluid level.

To facilitate this process, the calibrated container may have a fluid sensor. The fluid sensor indicates that the fluid is at the initial fluid level. A computer system may receive this indication and cause a pump to pump fluid from the secondary container to add fluid into the calibrated container or control the valve to drain fluid from the calibrated container to reach the initial fluid level. Alternatively, the fluid may be manually arranged at the initial fluid level.

Fluid in the secondary container is pumped by the pump from the secondary container, through the flow meter, and into the calibrated container. The flow meter measures total fluid volume pumped into the calibrated container. The calibrated container may have a fluid level sensor which indicates when the fluid in the calibrated container reaches a threshold fluid level at which point the pumping may stop. The calibrated container is known to hold a calibrated amount of fluid between the initial fluid level and the threshold fluid level. This calibrated amount may be compared to the total fluid volume measured by the flow meter. If the calibrated amount of fluid and the total fluid volume measured by the flow meter differ by less than a threshold amount, then the flow meter accuracy may be acceptable. If the calibrated amount of fluid and the amount of fluid measured by the flow meter differ by more than a threshold amount, then the flow meter accuracy may not be acceptable.

The pump may pump fluid as a result of a mechanical action which causes the pump to pump fluid. For example, the mechanical action might be a rotation of a wheel attached to a piston in a cylinder where each revolution of the wheel causes the piston to produce a given amount of suction which results in a given quantity of fluid being pumped by the pump, among other configurations. A calibration factor may be calculated which indicates how much fluid is pumped by the pump per mechanical action. In the case that the mechanical action is a rotation of a wheel, the calibration factor may be calculated by dividing the calibrated amount of fluid by the number of revolutions of the wheel of the pump rotated to fill the calibrated container with that amount of fluid. The calibration factor may be used to calculate an amount of fluid pumped by the pump if, for instance, the flow meter is defective or the pump is operated to pump fluid without also using a flow meter.

Accuracy of the flow meter and/or calculation of the calibration factor may be repeated one or more times by again opening the valve on the calibrated container to drain the fluid in the calibrated container into the secondary container, closing the valve, and then pumping the fluid into the calibrated container to determine the accuracy of the flow meter and/or calculation of the calibration factor. Further, the process may be repeated one or more times for one or more different flow meters and pumps using a single arrangement of the calibrated container and secondary container to determine accuracy of a plurality of flow meters and/or calculation of the calibration factor for a plurality of pumps. The process of draining the fluid in the from the calibrated container into the secondary container under a force of gravity for each test allows for using the same fluid during each test with minimal operator involvement.

Example Illustrations

Figure 1:
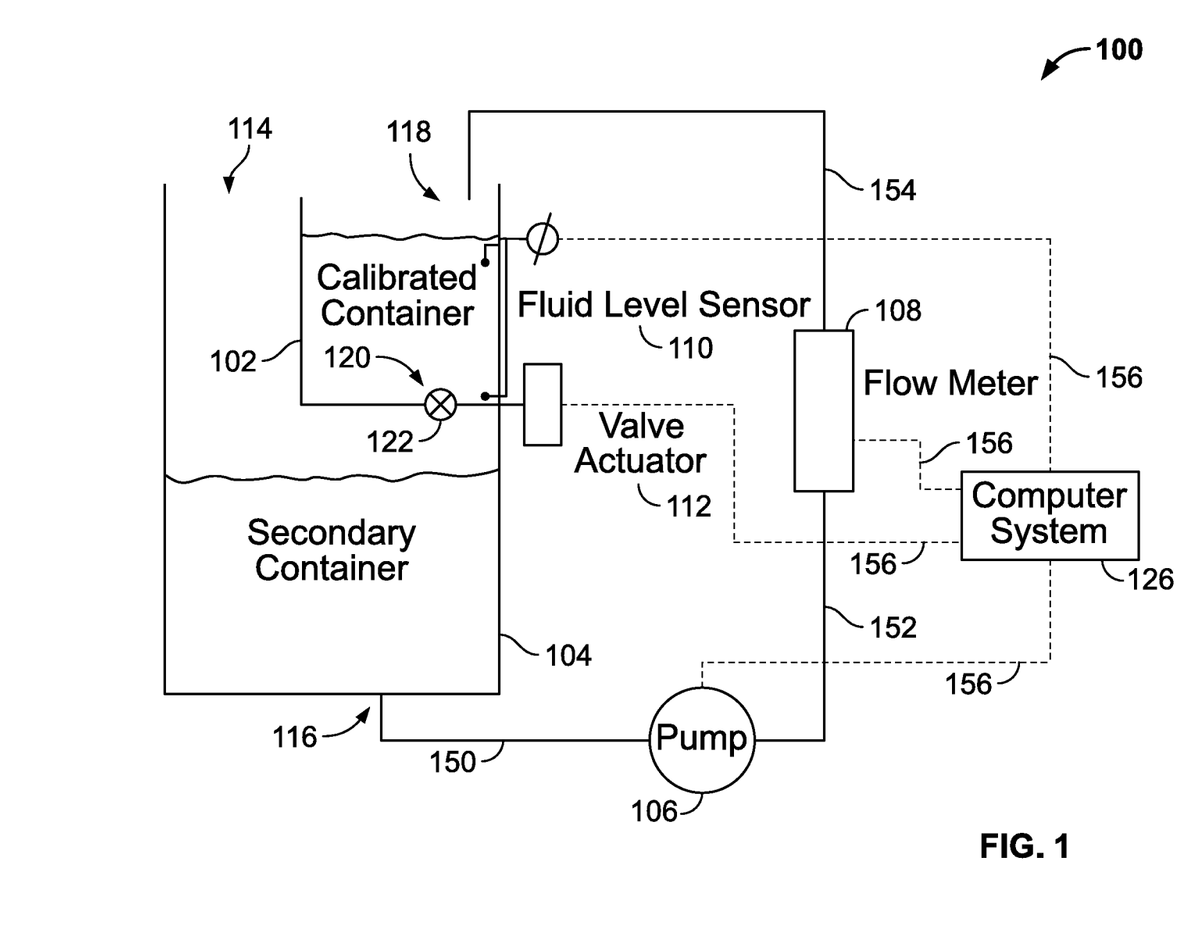
FIG. 1 illustrates a fluid diagnostic system arranged for characterizing performance of a pump and accuracy of a flowmeter.

FIG. 1 illustrates a fluid diagnostic system 100. The fluid diagnostic system 100 may include a calibrated container 102, a secondary container 104, a pump 106, a flow meter 108, one or more fluid level sensors 110, and a valve actuator 112 which are fluidly connected via conduits such as pipes or tubes 150, 152, 154. The fluid diagnostic system 100 may also have a computer system 126 arranged for characterizing performance of the pump 106 and verifying accurate operation of the flowmeter 108. In other arrangements, the fluid diagnostic system 100 may include more or less components.

The secondary container 104 may be a structure made of one or more of plastic or metal, for holding fluid. The secondary container 104 may have an input 114 for filling the secondary container with the fluid and an output 116 for removing the fluid from the secondary container 104. The fluid may be a liquid such as water or a chemical such as glycols or mineral oils, among other fluids.

The output 116 of the secondary container may be fluidly coupled to the pump 106 via a conduit 150. The pump 106 may produce a pressure and/or suction via a mechanical action such as a rotation of wheel connected to a piston in a cylinder which causes the pump to move fluid from the secondary container 104 to the pump 106 via the conduit 150, from the pump to the flow meter 108 via conduit 152, and from the flow meter 108 to the calibrated container 102 via the conduit 154.

The flow meter 108, also known as a flow gauge, flow indicator, or liquid meter may measure an amount of the fluid. For example, the flow meter 108 may take the form of a Coriolis meter which measures fluid flow which passes though the flow meter 108 in term of a mass and convert this mass into a measured volume. The fluid which passes through the flow meter may then flow to the calibrated container 102.

The calibrated container 102 may also be a structure made of one or more of plastic or metal, for storing the fluid pumped from the secondary container 104. The calibrated container 102 may be the same size and/or smaller than the secondary container 104. Further, in some examples, the calibrated container 102 may be affixed inside the secondary container 104 to form an integrated structure with the secondary container 104.

The calibrated container 102 may have an input 118 and an output 120. The input 118 may be used to fill the calibrated container with the fluid received from the flow meter 108 and the output 120 may be used to empty the fluid from the calibrated container 102 and into the secondary container 104. In some examples, the output 120 may be a lowest point in the calibrated container 102 and below any fluid sensor 110. The calibrated container and secondary container may be arranged such that the output 120 of the calibrated container is always above a maximum fluid level of the secondary container. The maximum fluid level may be a highest point of fluid in the secondary container at any time during operation of the fluid diagnostic system 100.

A valve may control passage of fluid in one or more directions. The valve 122 may control fluid flow through the output 120. In this regard, valve 122 may control passage of the fluid from the calibrated container 102 to the secondary container 104. The valve 122 may be opened and closed by a valve actuator 112. The valve actuator 112 may be a manual, mechanical, and/or electronic device that opens or closes the valve 122. The opening of the valve 122 allows for the fluid to flow from the calibrated container 102 to the secondary container 104 under a force of gravity and the closing of the valve actuator 112 stops the fluid from flowing from the calibrated container 102 to the secondary container 104. The calibrated container 102 may be physically located above the secondary container 104 so that the fluid which exits the calibrated container 102 can flow to the secondary container 104 under the force of gravity. Alternatively, the fluid can be pumped into the secondary container 104. Further, a level of fluid in the secondary container 104 may be always below the output 120 such that the fluid in the calibrated container 102 is able to freely flow into the secondary container 104.

The calibrated container 102 may be arranged with one or more fluid level sensors 110. The one or more fluid level sensors 110 may measure a level of the fluid in the calibrated container 102. In one example, the calibrated container 102 may have an upper and a lower fluid level sensor. The lower fluid sensor may be positioned near a bottom of the calibrated container 102 and above the output 120 and the upper fluid sensor may be positioned above the lower fluid sensor and near a top of the calibrated container 102. In another example, the one or more fluid sensors 110 may be a single fluid sensor that measures a continuous fluid level in the calibrated container such as the fluid level in a range of 0 to 100%. The one or more fluid level sensors 110 may take a variety of forms, including a float sensor, capacitive sensor, vibrating fork, and/or conductivity probes among other examples. The computer system 126 may be coupled to one or more of the valve actuator 112, flowmeter 108, fluid level sensor 110, and pump 106 via signaling lines 156. The computer system 126 may control the valve actuator 112 to start or stop fluid flow between the calibrated container 102 and the secondary container 104 by sending one or more signals via one or more of the signaling lines 156. Additionally, or alternatively, the computer system 126 may receive a signal from the fluid level sensor 110 indicative of a level of the fluid in the calibrated container 102 via one or more of the signaling lines 156. Still additionally, or alternatively, the computer system 126 may receive a signal indicative of a fluid flow through the flow meter 108 and a signal indicative of the mechanical action associated with pumping the fluid by the pump 106 via one or more of the signaling lines 156. Additionally, the computer system 126 may start and stop operation of the pump 106 by sending one or more signals via one or more of the signaling lines 156. The computer system 126 may perform other functions as well.

Figure 2A:
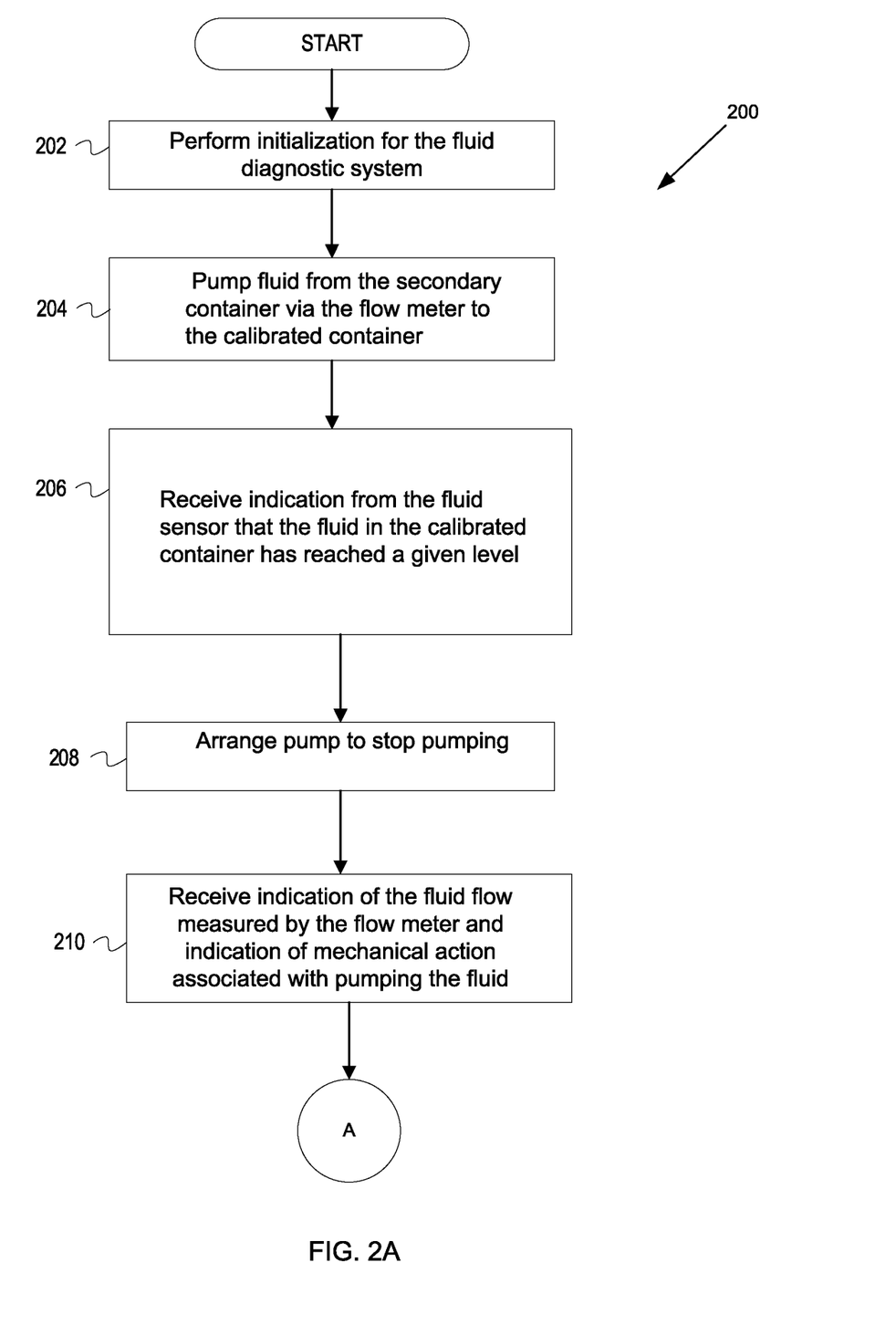
FIGS. 2A and 2B collectively illustrate a flow chart of functions associated with characterizing performance of a pump and accuracy of a flowmeter.
Figure 2B:
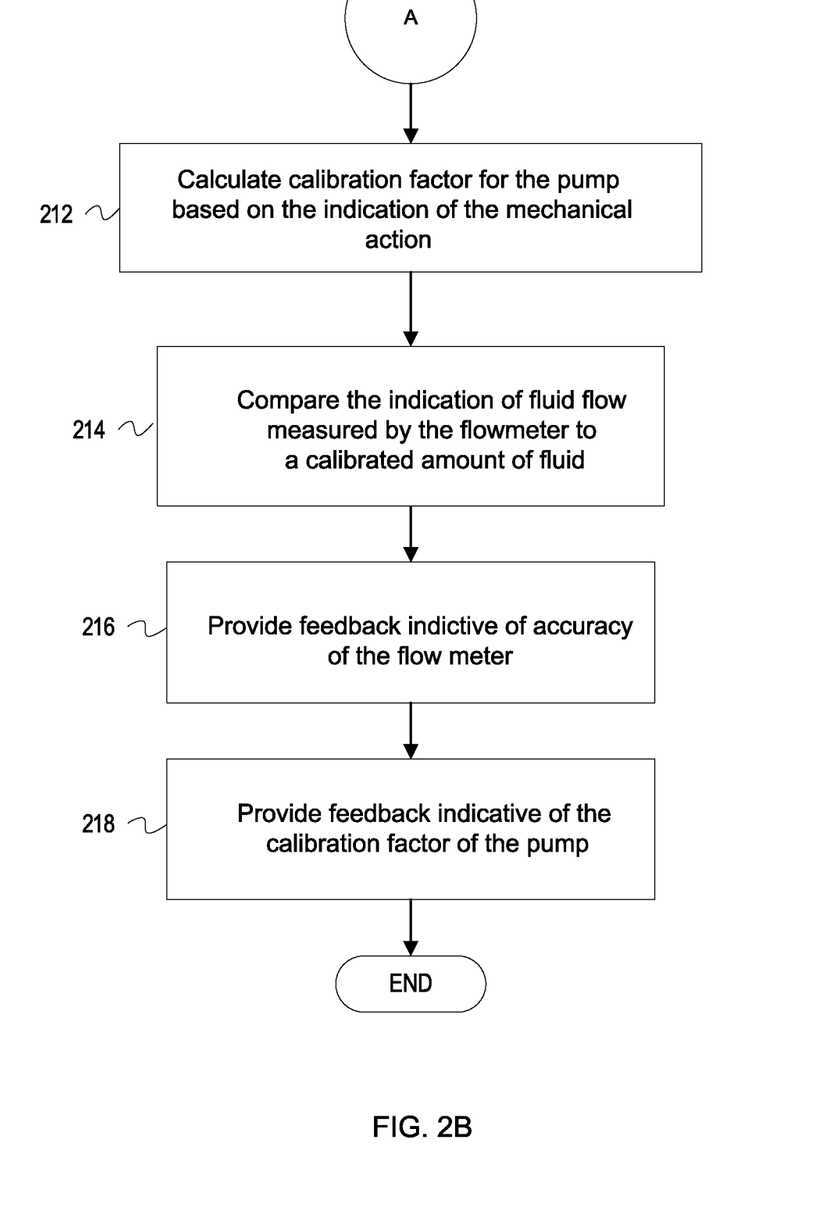

FIGS. 2A and 2B collectively illustrate a flow chart of functions 200 associated with characterizing performance of a pump and verifying accurate operation of a flowmeter. The functions may be performed by the computer system in conjunction with described components of the fluid diagnostic system in FIG. 1.

Briefly, at 202, an initialization may be performed for the fluid diagnostic system. At 204, the pump may be arranged to pump fluid from the secondary container via the flow meter to the calibrated container. At 206, an indication is received from the one or more fluid level sensors that the fluid in the calibrated container has reached a given level. At 208, the pump may be arranged to stop the pumping. At 210, an indication of total fluid volume measured by the flow meter and an indication of the mechanical action associated with pumping the fluid may be received. At 212, a calibration factor for the pump is calculated based on the indication of the mechanical action. At 214, the indication of total fluid volume measured by the flowmeter may be compared to an amount of fluid in the calibrated container. At 216, feedback is provided indictive of accuracy of the flow meter. At 218, feedback is provided indicative of the calibration factor for the pump.

Referring back, at 202, an initialization process may be performed for the fluid diagnostic system 100. The initialization process involves arranging the calibrated container with fluid at an initial fluid level. The initialization process may involve draining the fluid in the calibrated container 102 until the fluid in the calibrated container 102 is at the initial fluid level. For example, if there is fluid in the calibrated container 102, the valve 122 of the calibrated container 102 may be opened by the valve actuator 112 via the computer system 126 or manually by an operator so that any fluid in the calibrated container 102 exits into the secondary container 104 under a force of gravity until fluid level sensor 110 indicates to the computer system 126 that the fluid is at the initial fluid level at which point the valve 122 may be closed by the computer system 126 or manually by the operator. Alternatively, fluid may be added to the calibrated container 102 to reach the initial fluid level. The computer system 126 may cause the fluid in the secondary container 104 to be pumped into the calibration container 102 and stop pumping when the fluid is at the initial fluid level.

The initialization process may also involve setting an indication of mechanical action associated with the pump 106 pumping of the fluid and an indication of total fluid volume measured by the flow meter 108. The pump 106 and/or flow meter 108 may have corresponding counters which keep track of the respective indications. These indications may be reset to a known value, e.g., zero, so that any subsequent fluid which flows through the flow meter 108 or is pumped by the pump 106 after the initialization can be determined based on the known value. To illustrate, the indication of mechanical action associated with the pump 106 pumping of the fluid may be measured in terms of as number of revolutions of the wheel of the pump 106 associated with pumping fluid in a given period of time. The indication of total fluid volume measured by the flow meter 108 may be an amount of fluid which flows through the flow meter 108 in the given period of time. These counters may be set to known values.

At 204, the pump 106 may be arranged to pump fluid from the secondary container 104 via the flow meter 108 and to the calibrated container 102. For example, the computer system 126 may send a signal to the pump 106 to start pumping the fluid.

At 206, the computer system 126 may receive an indication from the fluid level sensor 110 that the fluid has reached a threshold fluid level in the calibrated container 102. The threshold fluid level may be a level of fluid in the calibrated container 102 above the initial fluid level. For example, the computer system 126 may monitor a signal from the fluid level sensor 110 in the calibrated container 102 which indicates that the fluid level is at the threshold fluid level. In this regard, the initialization process 202 may also include confirming that there is enough fluid in the secondary container 104 which can be pumped into the calibrated container 102 such that the threshold fluid level is reached during the pumping process. If there is not enough fluid, then additional fluid may be added into the secondary container 104 via the input 114 during the initialization process 202.

At 208, the pump 106 may be arranged to stop pumping fluid into the calibrated container 102 based on the fluid reaching the threshold fluid level.

At 210, an indication of the total fluid volume measured by the flow meter 108 and the indication of mechanical action associated with pumping the fluid by the pump 106 may be received. The indication of total fluid volume measured by the flow meter 108 may be an amount of fluid measured since the initialization at 202. The indication of mechanical action may be a count of mechanical actions, e.g., revolutions of a wheel of the pump 106 or cycles of a piston moving through a cylinder of the pump 106, since the initialization at 202. As an example, the pump 106 and/or flow meter 108 may provide a value of an associated counter defining the respective indication of mechanical action or total fluid volume, respectively, to the computer system 126.

At 212, a calibration factor for the pump 106 is calculated based on the indication of mechanical action along with the verification of the flow meter. A calibration factor may indicate an amount of fluid that is pumped per mechanical action of the pump 106. For example, the pump 106 may be designed to pump a certain amount of fluid per revolution of the wheel of the pump 106. The calibration factor may be initially set as the amount of fluid pumped per revolution. Then, the amount fluid pumped may be calculated in accordance with equation (1) as:

$$\text{Amount pumped} = \text{Calibration Factor} * \text{Indication of Mechanical Action} \quad (1)$$

To illustrate, if the calibration factor is 12 liters per revolution and the pump 106 cycled through 10 revolutions before the fluid in the calibrated container 102 reached the given level, then the calculated amount pumped is equal to 120 liters. The calculated amount pumped may be compared to the amount of fluid known to be in between initial fluid level and the threshold fluid level in the calibrated container 102. The amount may be determined during a calibration process where the fluid held by the container between the initial fluid level and threshold fluid level is physically measured and/or calculated based on a geometry of the calibration container 102. This amount is stored in memory of the computing system 126 as a calibrated amount of fluid. The calibrated amount of fluid may be then retrieved from the memory and compared to the calculated amount pumped. If a difference between the calculated amount pumped and the calibrated amount of fluid in the calibrated container 102 is greater than a threshold amount, then the calibration factor may be recalculated in accordance with equation (2) as:

$$\text{Calibration Factor} = \text{Calibrated Amount of Fluid in the Calibrated Container} / \text{Indication of Mechanical Action} \quad (2)$$

The recalculated calibration factor may account for a change from the initial calibration factor due to wearing of parts on the pump 106 such as seals and rings of the pump 106, a change in temperature of the pump 106, etc.

At 214, the total fluid volume measured by the flowmeter 108 may be compared to the calibrated amount of fluid to determine whether accuracy of the flowmeter 108 is acceptable. To illustrate, the calibrated amount of fluid may be 120 liters of fluid while the flow meter 108 indicates that 119 liters of fluid was measured by the flow meter 108. If a difference is within a threshold amount, then accuracy of the flow meter 108 is acceptable. If a difference is not within a given amount, then accuracy of the flow meter 108 is not acceptable and the flow meter 108 may be defective.

At 216, feedback is provided indictive of accuracy of the flow meter 108. The indication may be an alert such as an email or window presented on a display screen of the computer system 126. The alert may indicate whether the flow meter operation is acceptable or not. In some cases, an indication may be presented only if the accuracy of the flow meter 108 is acceptable or is not acceptable.

At 218, feedback is provided indicative of the calibration factor of the pump 106. The calibration factor may be that which was recalculated or the calibration factor which is confirmed to be accurate. The calibration factor may be used in equation (2) to determine an amount of fluid pumped by the pump 106 if, for instance, the flow meter 108 is not working, is inaccurate, or a comparison to accuracy of the flow meter 108 is desired. The calibration factor may be displayed on a display screen of the computer 126.

The functions 202-218 may be repeated one or more times for different operations of the pump 106. For example, the pump 106 may pump at different speeds, e.g., revolutions per minute (RPM), pressures, torques, to achieve the different flow rates, e.g., within a range of 1 to 50 gallons per minute. Accuracy of the flow meter 108 may be verified for the different operations. Also, a calibration factor may be further recalculated for the different operations. The functions 202-218 may also be repeated if the flow meter operation is not acceptable. For example, the flow meter 108 may be cleaned and retested. This process may continue until the flow meter accuracy is verified or it is determined that the flow meter 108 is defective. Further, the process of draining the fluid in the from the calibrated container into the secondary container under a force of gravity (and/or supplemented by another pump to speed draining) for each test allows for using the same fluid during each test with minimal operator involvement.

The feedback may be one or more curves displayed on the computer system 126 that show accuracy of the flow meter 108 as a function of operation of the pump 106 and/or the calibration factor as a function of operation of the pump 106.

Figure 3:
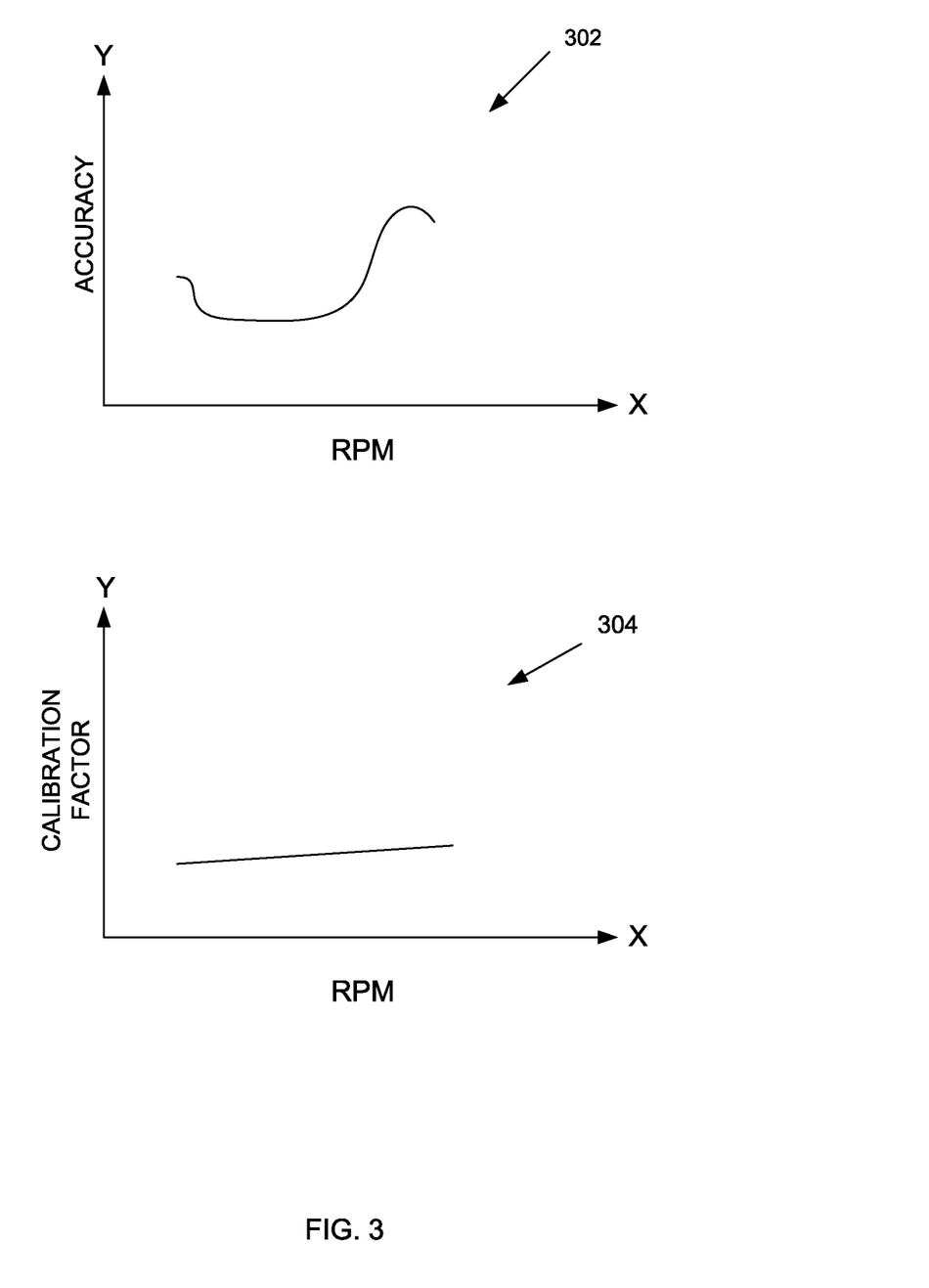
FIG. 3 illustrates example feedback.

FIG. 3 illustrates example feedback that the computer system 126 may provide. In the case that RPM of the pump 106 is varied for each test of a flow meter 108, a plot 302 with an X axis indicating RPM and Y axis indicating accuracy of the flow meter 108 may be shown on a display of the computer system 126. The accuracy may be indicative of how far off (i.e., difference) the flow meter measurement is from the calibrated amount of fluid in the calibrated container 102, e.g., measured as a ratio of the difference divided by the calibrated amount of fluid. In the plot 302, accuracy may generally increase with RPM. Additionally, a plot 304 with an X axis indicating RPM and Y axis indicating calibration factor of the pump 106 may be shown on a display of the computer system 126. In the plot 304, a calibration factor may also generally increase with RPM. The results may take other forms as well depending on how the operation of the pump 106 is varied and design of the pump 106 and flow meter 108.

In some examples, the fluid level sensor 110 may provide an indication that there is a given mass of fluid in the calibrated container 102 and the flow meter 108 may indicate total fluid in terms of a mass. To facilitate this measurement, the calibrated container 102 may not be permanently affixed to the secondary container 104 but rather mounted on a scale in the secondary container 104. The scale may be arranged below the calibrated container 102 for weighting the fluid in the calibrated container 102. Verification of accuracy of the flow meter 108 and determination of the calibration factor for the pump 106 may be based on comparisons of mass rather than volume as described above. In some examples, one or more of the calibrated amount of fluid in the calibrated container 102, total fluid measured by the flowmeter 108, and amount of fluid pumped by the pump 106 may be in differing measurement units. Some may provide measurements in terms of volume and others in terms of mass. The functions 210, 212 may also involve converting to a common unit of mass and/or volume for calculation and/or comparison.

Further, the fluid diagnostic system described above is exemplary in nature. The fluid diagnostic system may take various other forms.

For example, the fluid diagnostic system described above shows a pump which stops pumping when the fluid in the calibration container reaches a given level. Instead of reaching a given level, the pumping may be stopped after a certain indication such as a number or revolution of the pump or period of time. Then, an amount of fluid between the initial fluid level before pumping and the fluid level in the calibration container after the pumping stopped may be determined. The computer system may store an indication of the amount of fluid between the initial fluid level and the fluid level in the calibration container. This indication may then be used to determine accuracy of the flow meter etc. in steps 210-218.

As another example, the fluid diagnostic system described above shows a calibration container with one or more fluid sensors. Instead, the secondary container may have one or more fluid sensors instead of or in addition to the calibration container. An amount of fluid pumped into the calibrated container may be determined based on the fluid measured by one or more fluid sensors in the secondary container instead of or in addition to the one or more fluid sensors in the calibration container.

As yet another example, the fluid diagnostic system described above shows a single pump to test a single flow meter. The fluid diagnostic system may be arranged so that a single pump feeds to a plurality of flow meters connected in series which in turn flow into the calibrated container. The plurality of flow meters may provide an indication of total fluid volume which may evaluated for accuracy rather than evaluating flow meters accuracy individually. Other examples are also possible.

Figure 4:
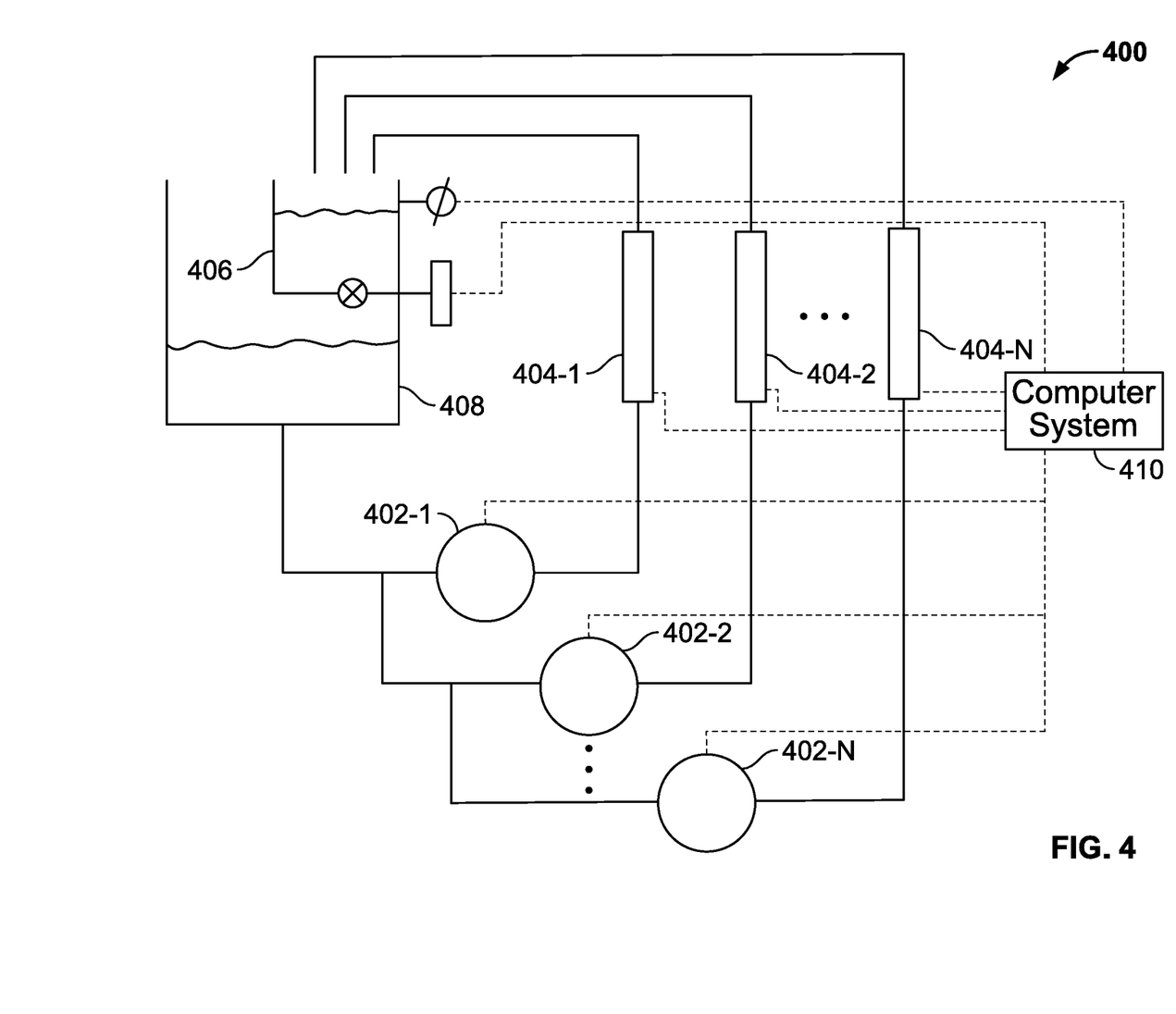
FIG. 4 illustrates a fluid diagnostic system associated with characterizing performance of a plurality of pumps and accuracy of flow meters.

FIG. 4 illustrates a fluid diagnostic system 400 associated with characterizing performance and verifying accuracy of operation of a plurality of pumps 402-1 to 402-N and flow meters 404-1 to 404-N with a single calibrated container 406 and secondary container 408. The functions of FIG. 2 may be performed by a computer system 410. The computer system 410 may select a pump and flow meter from the plurality and perform the functions 200 of FIG. 2 for the selected pump and flow meter. For example, the computer system 410 may select pump 402-1 and flow meter 404-1 and perform the functions of FIG. 2 for pump 402-1 and flow meter 404-1 while remaining pumps are off. Then, the computer system 410 may select pump 402-2 and flow meter 404-2 and perform the functions of FIG. 2 for pump 402-2 and flow meter 404-2 while remaining pumps are off. This process may continue for each pump and associated flow meter of the plurality of pumps and plurality of flow meters to determine respective feedback associated with each of the pumps 402-1 . . . N and flow meters 404-1 . . . N.

Figure 5:
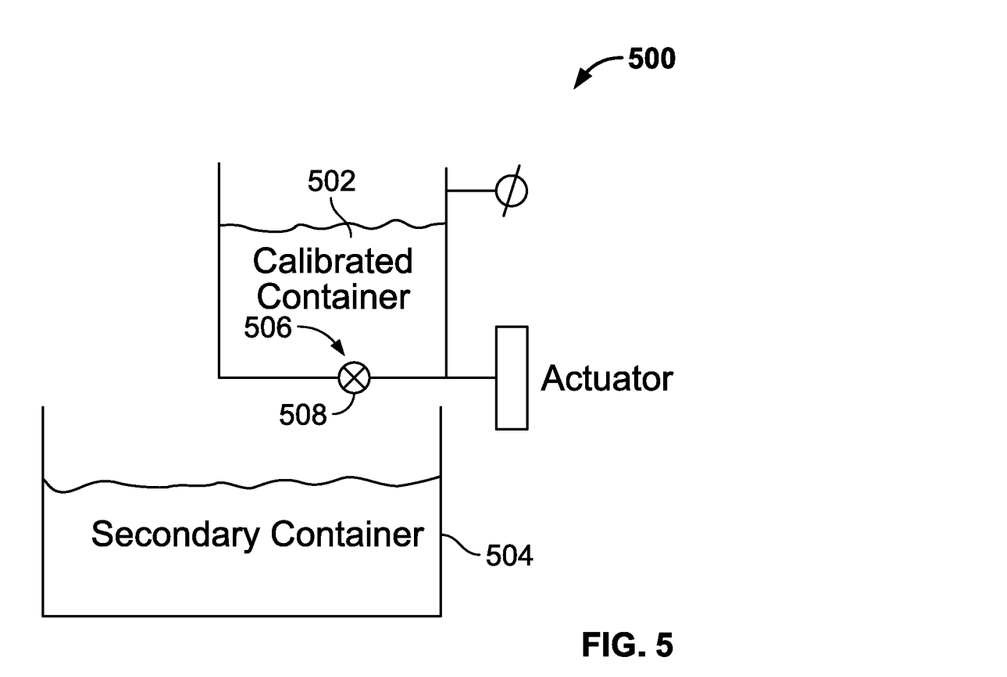
FIG. 5 and FIG. 6 illustrate various alternatives for arranging the calibrated container with respect to the secondary container.
Figure 6:
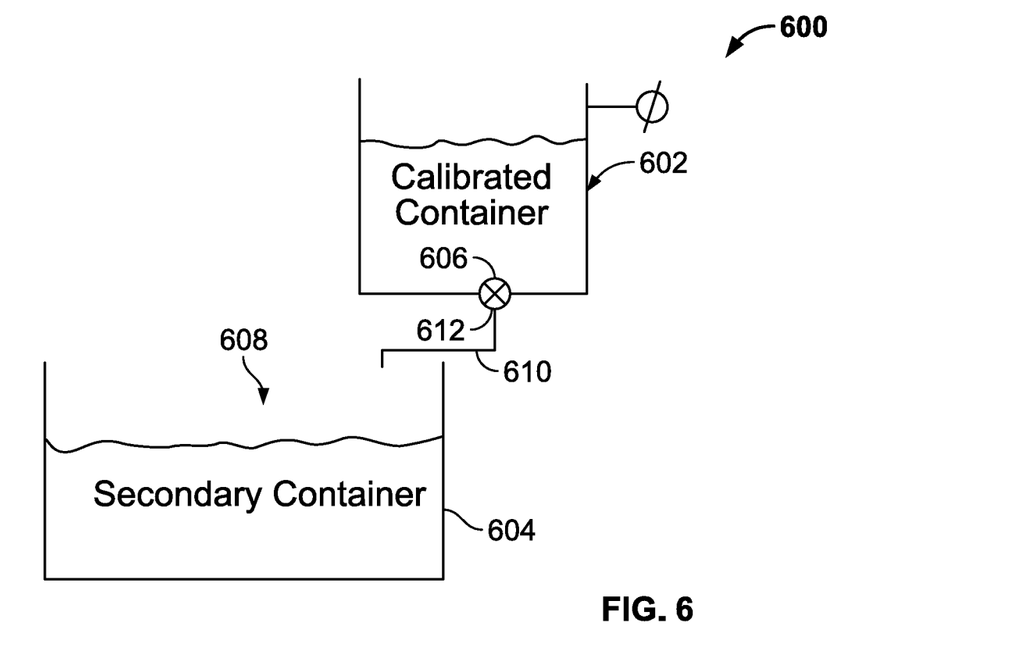

FIG. 5 and FIG. 6 illustrate various alternatives for arranging the calibrated container with respect to the secondary container. In common, the arrangements allow the fluid to flow from the calibrated container to the secondary container under a flow of gravity.

FIG. 5 illustrates an arrangement 500 where a calibrated container 502 is not inside a secondary container 504 as shown in FIG. 1 but instead arranged above the secondary container 504 and supported by a support structure (not shown). The calibrated container 502 may have an output 506 with a valve 508 which can be opened to drain the fluid in the calibrated container 502 during the initialization process. In this regard, the fluid in the calibrated container 502 flows under the force of gravity from the output 506 to the secondary container 504.

FIG. 6 illustrates an arrangement 600 where a calibrated container 602 is not inside the secondary container 604 but arranged outside the secondary container 604 and supported by a support structure (not shown). Again, the calibrated container 602 may have an output 606. Further, the output 606 of the calibrated container 602 may be coupled to an input 608 of the secondary container 604 via a conduit 610 and a valve 612 can be opened to drain the fluid in the calibrated container 602 during the initialization process. Also, in this arrangement, the fluid in the calibrated container 602 flows under the force of gravity to the secondary container 604.

The fluid diagnostic systems shown in FIGS. 1, 3-6 may verify accuracy of a flow meter and determine a calibration factor for a pump. Then, the flow meter and pump may be removed from the fluid diagnostic systems and used for measuring fluid flow and/or pumping fluid for a particular application. Alternatively, the fluid diagnostic systems may be coupled to another system to control fluid flow to another system.

Figure 7:
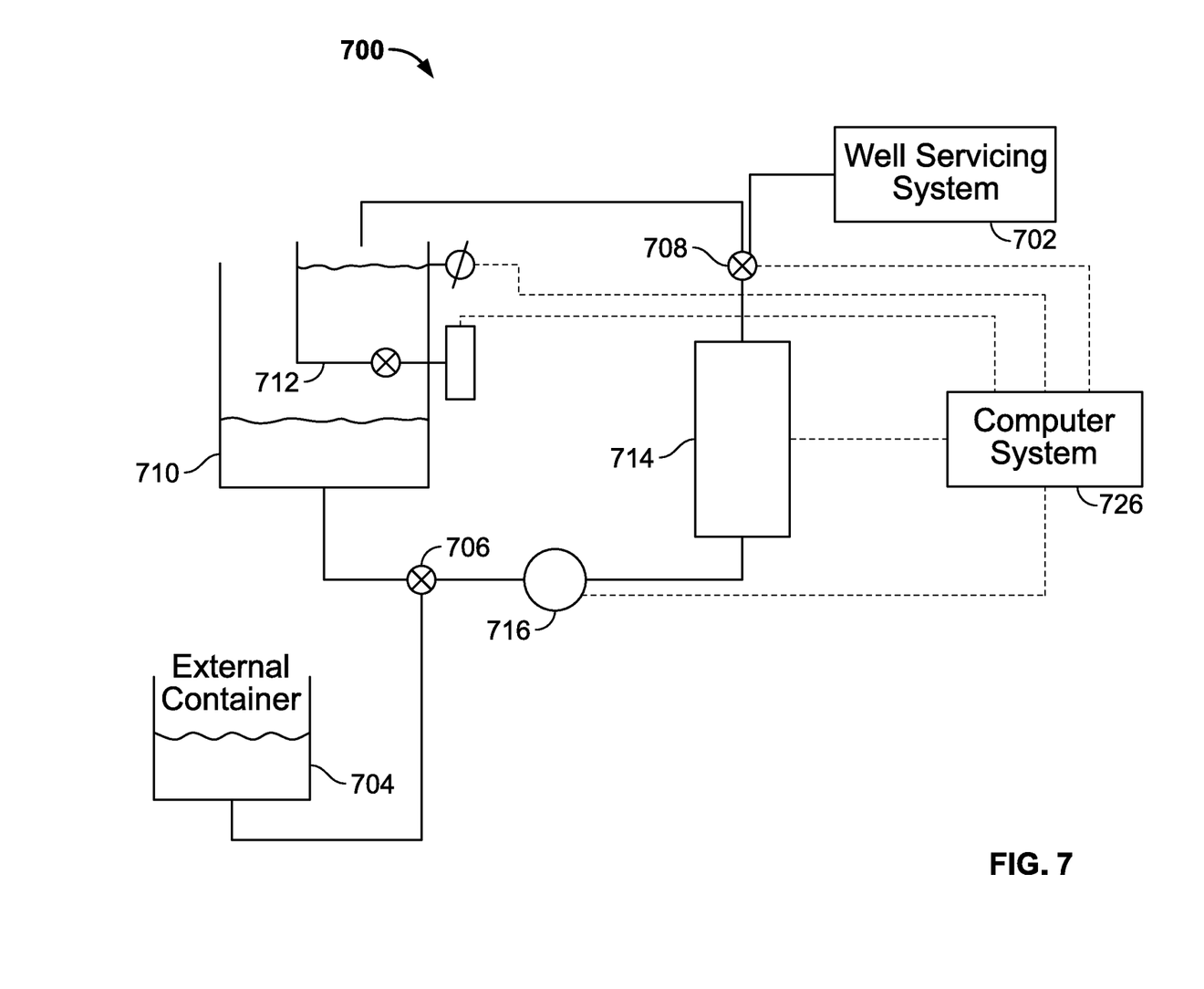
FIG. 7 illustrates a fluid diagnostic system coupled to a well servicing system to control fluid flow in a drilling context to facilitate extraction of hydrocarbons.

FIG. 7 illustrates fluid system 700 being coupled to a well servicing system 702. The well servicing system 702 may facilitate extraction of hydrocarbons. For example, the well serving system 702 may be a frac blending system which receives measured amounts of fluid from the fluid system 700 to be mixed with additives and pumped downhole to facilitate extraction of the hydrocarbons. The fluid system 700 may include the fluid diagnostic system 100 which is illustrated in FIG. 1. The fluid system 700 may further include an external container 704, valve 706, and valve 708. The external container 704 may be yet another container for storing fluid. Unlike the fluid in the secondary container 104 which may be water, the fluid in the external container 704 may take the form of a pH fluid, friction reducers, or a bactericide which is pumped downhole and/or mixed with an additive to facilitate hydrocarbon extraction, e.g., as part of fracturing process among other processes.

The valve 706 and valve 708 may allow for selecting fluid to flow from the secondary container 710 or the external container 704. Further the valve 708 may allow for diverting the fluid pumped to the calibrated container 712 or to the well servicing system 702. The valve 706 and valve 708 may be controlled by the computer system 726 and/or be manually operated. For example, the valve 706 may be arranged to receive fluid from the secondary container 710 and the valve 708 arranged to divert fluid to the calibrated container 712 during verification of a flow meter 714 and calculation of a calibration factor for a pump 716. Then, the valve 706 may be arranged to receive fluid from the external container 704 and the valve 708 arranged to divert fluid to the well servicing system 702 during operation of the well servicing system 702 and after accuracy of the flowmeter 714 is verified and/or the calibration factor for the pump 716 is calculated. In this regard, the computer system 726 may control the pumping by the pump 716 and/or monitor the flow meter 714 so that an accurate amount of fluid is pumped to the well servicing system 702, e.g., based on verified accurate flow measured by the flow meter 714 and a known calibration factor of the pump 716. For example, the computer system 726 may control pumping so that a given amount of fluid as indicated by the flow meter 714 is pumped at which point the pumping is stopped. The calibrated container 712 and secondary container 710 may be arranged in a variety of other ways as described above, an example of which is shown.

In some examples, the fluid system 700 may not have an external container 704 and fluid from the secondary container 710 may be pumped to the well servicing system 702. In this case, the secondary container 710 may store the fluid needed for drilling operations. Other variations are also possible for sourcing the fluid.

Figure 8:
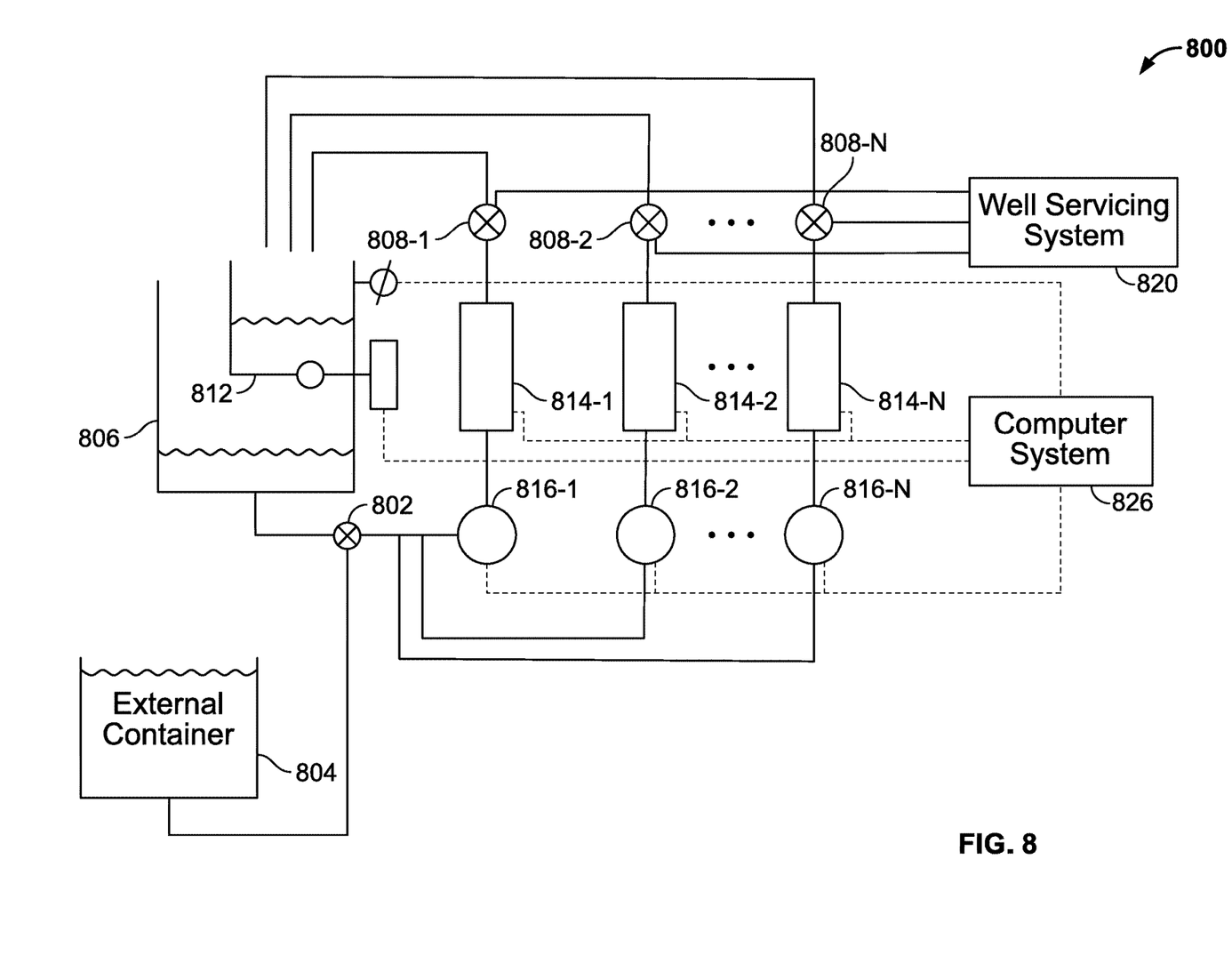
FIG. 8 illustrates another fluid diagnostic system coupled to a well servicing system to control fluid flow in a drilling context to facilitate extraction of hydrocarbons.

FIG. 8 illustrates fluid system 800 coupled to a well servicing system 820 to control fluid flow in a drilling context to facilitate extraction of hydrocarbons. The fluid system 800 includes a plurality of pumps 816-1 . . . N and flow meters 814-1 . . . N. A valve 802 may be arranged to control whether fluid is pumped from an external container 804 or secondary container 806 to the pumps 816-1 . . . N and a plurality of valves 808 may be arranged so that the pumped fluid is diverted from a given flow meter 804-1 . . . N to the well servicing system 820 or to the calibrated container 812. For example, the valve 802 may be arranged to receive fluid from the secondary container 806 and a valve 808-1 of the plurality of valves 808-1 . . . N may be arranged to output fluid to the calibrated container 812 to characterize performance of the pump 816-1 and verify accurate operation of the flow meter 804-1. Then, the valve 802 may be arranged to receive fluid from the external container 804 and the valve 808-1 of the plurality of valves 808 may be arranged to output fluid to the well servicing system 820 after accuracy of the flowmeter 814-1 is verified and/or the calibration factor for the pump 816-1 is calculated. Then the pump 816-1 may pump fluid under a control of the computer system 826. The computer system 826 may perform similar steps for corresponding pairs of the pumps 816-1 . . . N and flow meters 814-1 . . . N. In this arrangement, an accurate amount of fluid may be pumped to the well servicing system 820 based on verified accurate flow measured by the flow meter 814-1 . . . N and a known calibration factor of the pump 816-1 . . . N which can also be used to calculate fluid pumped by the pump 816. Further, a plurality of pumps 816-1 . . . N and flow meters 814-1 . . . N can be operated together to pump measured amounts of fluid to the well servicing system 820.

In some examples, the external container 804 in FIG. 8 may be plurality of external containers. Further, each pump in the fluid system 800 may be coupled to a respective external container and the secondary container via a respective 3-way valve rather than valve 802. Each external container may contain a different type of fluid. A pump may be characterized and a flow meter accuracy verified by setting the 3 way valve to provide fluid from the secondary container 806 to a given pump and given flowmeter and setting respective valve 808 to output the fluid to the calibrated container 812. After verification of a given flow meter and characterizing a given pump, fluid from an external container associated with the given pump and given flow meter may be arranged to flow from the external container 804 to the well servicing system 820. For instance, the computer system 826 may select the given pump and given flow meter and arrange the respective 3-way valve and valve 808 so that a certain type of fluid is pumped to the well servicing system 820.

Figure 9:
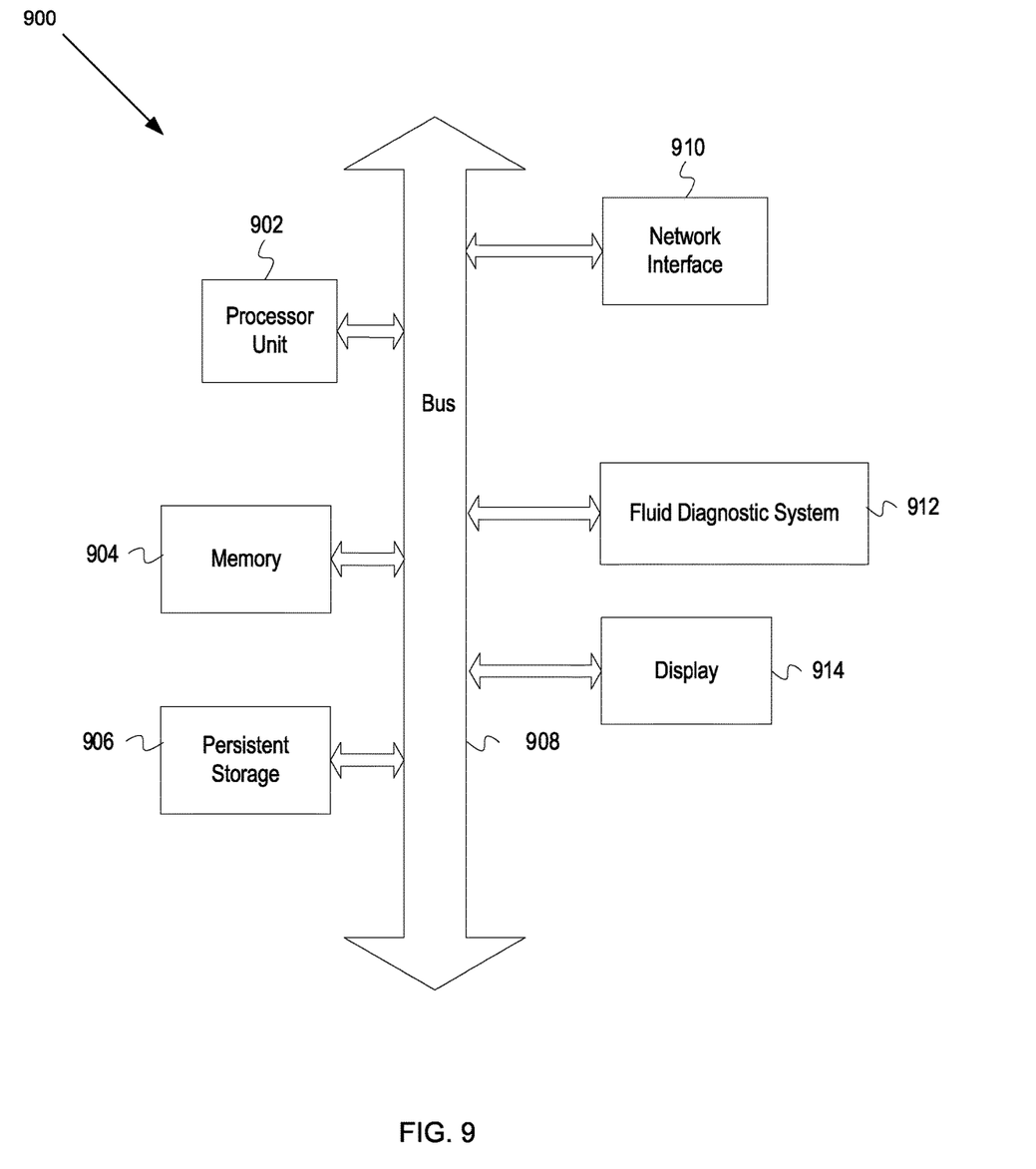
FIG. 9 is a block diagram of apparatus for characterizing performance of a pump and accuracy of one or more flowmeters.

FIG. 9 is a block diagram of apparatus 900 (e.g., the computing system) for characterizing performance of a pump and accuracy of a flowmeter as described above.

The apparatus 900 includes a processor 902 (possibly including multiple processors, multiple cores, multiple nodes, and/or implementing multi-threading, etc.). The apparatus 900 includes memory 904. The memory 904 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The apparatus 900 may also include a persistent data storage 906. The persistent data storage 906 can be a hard disk drive, such as magnetic storage device. The computer device also includes a bus 908 (e.g., PCI, ISA, PCI-Express, HyperTransport® bus, InfiniBand® bus, NuBus, etc.) and a network interface 910 in communication with the sensor tool. The apparatus 900 may have a fluid diagnostic system 912 to characterize performance of a pump and accuracy of a flowmeter based on the functions described above.

Further, the apparatus 900 may further comprise a display 914. The display 914 may comprise a computer screen or other visual device. The display 914 may show feedback characterizing performance of the pumps and/or verification of accuracy of the flow meter as described above.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 202-218 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any non-transitory tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for formation properties ahead of a drill bit as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

Embodiment 1

A method comprising: causing a valve of a first container to be opened to remove fluid from the first container into a second container, wherein the output of the first container is arranged to be above a maximum fluid level of the second container; causing the valve of the first container to be closed based on a fluid sensor indicating that a fluid level in the first container is at a first fluid level; causing a pump to pump the fluid from the second container to the first container via a flow meter; receiving an indication after pumping the fluid; causing the pump to stop pumping the fluid from the second container to the first container based on the indication; determining an amount of fluid pumped into the first container based on the first fluid level and a second fluid level indicated by the fluid sensor; comparing an indication of total fluid volume measured by the flow meter to the amount of fluid pumped; and outputting an indication of accuracy of the flow meter based on the comparison.

Embodiment 2

The method of Embodiment 1 or 2, further comprising receiving an indication of a number of revolutions of the pump to pump the fluid to the first container and calculating a calibration factor indicative of an amount of fluid pumped by the pump per revolution.

Embodiment 3

The method of any one of Embodiments 1-2, wherein the fluid is a first fluid, further comprising arranging the pump to pump a second fluid from a third container via the flow meter to a well servicing system based on the indication of accuracy of the flow meter.

Embodiment 4

The method of any one of Embodiments 1-3, wherein the first fluid and second fluid are different types of fluid.

Embodiment 5

The method of any one of Embodiments 1-4, wherein comparing the indication of the total fluid volume measured by the flow meter to the amount of fluid pumped comprises determining whether a difference between the indication of the total fluid volume measured by the flow meter to the amount of fluid pumped is less than a threshold amount.

Embodiment 6

The method of any one of Embodiments 1-5, wherein the first container is inside the second container above the maximum fluid level.

Embodiment 7

The method of any one of Embodiments 1-6, wherein the first container is positioned on a side of the second container and wherein the first container empties the fluid into the second container via a conduit under a force of gravity.

Embodiment 8

The method of any one of Embodiments 1-7, wherein the first container is above the second container.

Embodiment 9

The method of any one of Embodiments 1-8, wherein sending the first signal to open the valve which causes the first container arranged above the second container to remove fluid into second container causes the fluid to exit the first container at a lowest point of the first container.

Embodiment 10

One or more non-transitory machine-readable media comprising program code, the program code to: cause a valve of a first container to be opened to remove fluid from the first container into a second container, wherein the output of the first container is arranged to be above a maximum fluid level of the second container; cause the valve of the first container to be closed based on a fluid sensor indicating that a fluid level in the first container is at a first fluid level; cause a pump to pump the fluid from the second container to the first container via a flow meter; receive an indication after pumping of the fluid; cause the pump to stop pumping the fluid from the second container to the first container based on the indication; determine an amount of fluid pumped into the first container based on the first fluid level and a second fluid level indicated by the fluid sensor; compare an indication of total fluid volume measured by the flow meter to the amount of fluid pumped; and output an indication of accuracy of the flow meter based on the comparison.

Embodiment 11

The one or more non-transitory machine-readable media of Embodiment 10, further comprising program code to receive an indication of a number of revolutions of the pump to pump the fluid to the first container and program code to calculate a calibration factor indicative of an amount of fluid pumped by the pump per revolution.

Embodiment 12

The one or more non-transitory machine-readable media of Embodiment 10 or 11, wherein the fluid is a first fluid, further comprising arranging the pump to pump a second fluid from a third container via the flow meter to a well servicing system based on the indication of accuracy of the flow meter.

Embodiment 13

The one or more non-transitory machine-readable media of any one of Embodiments 10-12, wherein the pump is one of a plurality of pumps and the flow meter is one of a plurality of flow meters, the one or more non-transitory machine-readable media further comprises program code to select the pump and flow meter and wherein causing the pump to pump the fluid from the second container to the first container via the flow meter comprises causing the selected pump to pump the fluid from the second container to the first container via the selected flow meter.

Embodiment 14

The one or more non-transitory machine-readable media of any one of Embodiments 10-13, wherein the program code to compare the indication of the fluid flow measured by the flow meter to the amount of fluid pumped comprises program code to determine whether a difference between the indication of the fluid flow measured by the flow meter to the amount of fluid pumped is less than a threshold amount.

Embodiment 15

The one or more non-transitory machine-readable media of any one of Embodiments 10-14, wherein the program code to cause the valve of the first container to be opened further causes the fluid to exit the first container at a lowest point of the first container.

Embodiment 16

A fluid diagnostic system comprising a first container and a second container, wherein an output of the first container is arranged to be above a maximum fluid level of the second container; memory arranged to store an indication of an amount of fluid that the first container stores between a first fluid level and a second fluid level; a valve which controls fluid flow from the output of the first container to the second container under a force of gravity; one or more fluid sensors arranged to sense one or more fluid levels in the first container; a plurality of fluid meters; a plurality of pumps for pumping fluid from the second container to the first container to cause the fluid in the first container to move from the first level to the second level in the first container; wherein each of the fluid meters is fluidly coupled to the first container; wherein each of the plurality of pumps is fluidly coupled to the second container; and wherein a pump of the plurality of pumps is fluidly coupled to one or more flow meters of the plurality of flow meters.

Embodiment 17

The fluid diagnostic system of Embodiment 16, wherein the first container is affixed inside the second container.

Embodiment 18

The fluid diagnostic system of Embodiment 16 or 17, wherein the first container is positioned outside of the second container and wherein the first container empties the fluid into the second container via a conduit under the force of gravity.

Embodiment 19

The fluid diagnostic system of any one of Embodiments 16-18, wherein the first container above the second container.

Embodiment 20

The fluid diagnostic system of any one of Embodiments 16-19, further comprising a valve for diverting fluid flow associated with each pump and respective one or more flow meters from the first container to a well servicing system.

What is claimed is:

1. A method comprising:
   causing a valve of a first container to be opened to remove fluid from the first container into a second container, wherein the first container is inside the second container above a maximum fluid level of the second container;
   causing the valve of the first container to be closed based on a fluid sensor indicating that a fluid level in the first container is at a first fluid level;
   causing a pump to start pumping the fluid from the second container to the first container via a flow meter;
   receiving an indication after the pump starts pumping the fluid;
   causing the pump to stop pumping the fluid from the second container to the first container based on the indication;
   determining an amount of fluid pumped into the first container based on the first fluid level and a second fluid level indicated by the fluid sensor;
   comparing an indication of total fluid volume measured by the flow meter to the amount of fluid pumped; and
   outputting an indication of accuracy of the flow meter based on the comparison.

2. The method of claim 1, further comprising receiving an indication of a number of revolutions of the pump to pump the fluid to the first container and calculating a calibration factor indicative of an amount of fluid pumped by the pump per revolution.

3. The method of claim 1, wherein the fluid is a first fluid, further comprising arranging the pump to pump a second fluid from a third container via the flow meter to a well servicing system based on the indication of accuracy of the flow meter.

4. The method of claim 3, wherein the first fluid and second fluid are different types of fluid.

5. The method of claim 1 wherein comparing the indication of the total fluid volume measured by the flow meter to the amount of fluid pumped comprises determining whether a difference between the indication of the total fluid volume measured by the flow meter to the amount of fluid pumped is less than a threshold amount.

6. The method of claim 1, wherein the first container is positioned on a side of the second container and wherein the first container empties the fluid into the second container via a conduit under a force of gravity.

7. The method of claim 1, wherein the first container is above the second container.

8. The method of claim 1, wherein sending a first signal to open the valve that causes the first container arranged above the second container to remove fluid into second container causes the fluid to exit the first container at a lowest point of the first container.

9. A system comprising:
  a first container arranged inside a second container above a maximum fluid level of the second container; and
  one or more non-transitory machine readable media comprising program code that when executed by a computer causes the computer to,
    cause a valve of the first container to be opened to remove fluid from the first container into the second container;
    cause the valve of the first container to be closed based on a fluid sensor indicating that a fluid level in the first container is at a first fluid level;
    cause a pump to start pumping the fluid from the second container to the first container via a flow meter;
    receive an indication after the pump starts pumping the fluid;
    cause the pump to stop pumping the fluid from the second container to the first container based on the indication;
    determine an amount of fluid pumped into the first container based on the first fluid level and a second fluid level indicated by the fluid sensor;
    compare an indication of total fluid volume measured by the flow meter to the amount of fluid pumped; and
    output an indication of accuracy of the flow meter based on the comparison.

10. The system of claim 9, further comprising program code to receive an indication of a number of revolutions of the pump to pump the fluid to the first container and program code to calculate a calibration factor indicative of an amount of fluid pumped by the pump per revolution.

11. The system of claim 9, wherein the fluid is a first fluid, further comprising program code to arrange the pump to pump a second fluid from a third container via the flow meter to a well servicing system based on the indication of accuracy of the flow meter.

12. The system of claim 9, wherein the pump is one of a plurality of pumps and the flow meter is one of a plurality of flow meters, the one or more non-transitory machine-readable media further comprises program code to select the pump and flow meter and wherein causing the pump to pump the fluid from the second container to the first container via the flow meter comprises causing the selected pump to pump the fluid from the second container to the first container via the selected flow meter.

13. The system of claim 9, wherein the program code to compare the indication of the fluid flow measured by the flow meter to the amount of fluid pumped comprises program code to determine whether a difference between the indication of the fluid flow measured by the flow meter to the amount of fluid pumped is less than a threshold amount.

14. The system of claim 9, wherein the program code to cause the valve of the first container to be opened further causes the fluid to exit the first container at a lowest point of the first container.

* * * * *